No. 612,308. Patented Oct. 11, 1898.
J. COEFIELD.
BICYCLE WHEEL.
(Application filed Mar. 16, 1898.)

(No Model.)

WITNESSES:
Otis D. Swett.
L. W. Hyde.

INVENTOR
John Coefield.
BY
Thomas P. Simpson
ATTORNEY.

UNITED STATES PATENT OFFICE.

JOHN COEFIELD, OF FRANKLIN, PENNSYLVANIA.

BICYCLE-WHEEL.

SPECIFICATION forming part of Letters Patent No. 612,308, dated October 11, 1898.

Application filed March 16, 1898. Serial No. 674,042. (No model.)

*To all whom it may concern:*

Be it known that I, JOHN COEFIELD, a citizen of the United States, residing at Franklin, in the county of Venango and State of Pennsylvania, have invented certain new and useful Improvements in Bicycle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to that class of bicycle-tires in which the resiliency is produced by springs instead of air; and it consists in making the outer rim, upon which the rubber tire is placed, adjustable to take up any slack in the tire, the latter being liable to lose its tautness from wear and other causes.

Figure 1:
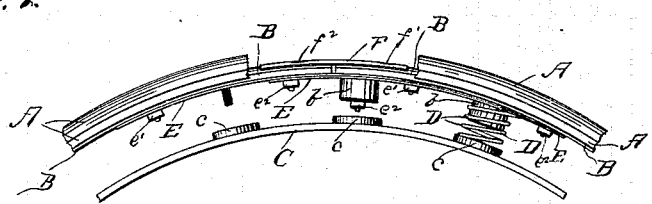
Figure 2:
Figure 3:
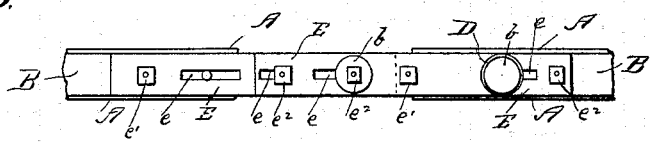

Figure 1 of the drawings is a side elevation of a portion of tire, rims, springs, and plates; Fig. 2, a top plan view thereof, and Fig. 3 a bottom plan view laid flat.

In the drawings, A represents the rubber tire, which is fitted tightly about an outer rim B, that is separated from the inner or spoke rim C by the springs D. The latter are coiled at one end about the studs $b$, projecting from the outer rim, and fitted at the other end in sockets $c$ of the inner rim. The outer rim B has two ends, which abut against one another, but are movable to and from each other, so as to tighten the rubber tire. In order to secure this adjustability, I use two interior interlapping plates E E, which are slotted at $e$ and clamped to the rim B by the screws and nuts $e'$ $e^2$; also, an exterior joint-plate F, slotted at $f$ and held by the screws and nuts $f'$ $f^2$ to the rim B. Whenever the tire loses its required tautness, the rim B is expanded to the desired extent by loosening the nuts, adjusting it, and then clamping it at the proper adjustment, the plates being movable by means of their slots on the clamping-screws.

By this construction I not only obtain a tire which has greater resiliency than the pneumatic tire, is punctureless, and very durable, but one which is much cheaper, less liable to get out of repair, and more easily manipulated by the rider himself.

The springs between the inner and outer rims may be varied in form and position very much without rendering my adjustable outer rim inapplicable. Hence I do not confine myself to any particular spring, tire, or inner rim; but What I do claim as my invention is—

In a bicycle-wheel, a spoke and a tire-rim separated by spiral springs; the slotted interlapping plates E arranged under the tire-rim B, the slotted joint-plate F arranged over said rim's free ends, and suitable screws with nuts to clamp said plates to the rim B, all combined as shown and described.

In testimony whereof I affix my signature in presence of two witnesses.

JOHN COEFIELD.

Witnesses:
A. B. RICHMOND,
A. B. GASTON.